United States Patent

[11] 3,584,899

| [72] | Inventors | Georg Gottler;<br>Horst Gottler, both of Munich, Germany |
|---|---|---|
| [21] | Appl. No. | 808,620 |
| [22] | Filed | Mar. 19, 1969 |
| [45] | Patented | June 15, 1971 |
| [73] | Assignee | Johann Rockinger |
| [32] | Priority | Mar. 26, 1968, Sept. 20, 1968 |
| [33] | | Germany |
| [31] | | P 17 55 062.8 and P 17 80 488.5 |

[54] MECHANISM FOR ADJUSTING THE POSITION OF A SEMITRAILER COUPLER ON A SEMITRAILER TRACTOR
11 Claims, 18 Drawing Figs.

[52] U.S. Cl. ........................................... 280/407
[51] Int. Cl. ........................................... B62d 53/08
[50] Field of Search ........................... 280/407, 81 80(B); 177/136

[56] References Cited
UNITED STATES PATENTS

| 2,589,678 | 3/1952 | Delay | 280/407 |
| 2,646,272 | 7/1953 | Swift | 280/423 UX |
| 2,813,709 | 11/1957 | Brier | 177/136 |
| 2,835,504 | 5/1958 | Acker | 280/81 |
| 2,900,194 | 8/1959 | Delay | 280/34 |
| 3,096,993 | 7/1963 | McKay | 280/81 |
| 3,112,936 | 12/1963 | Cole et al. | 280/407 |

*Primary Examiner*—Leo Friaglia
*Attorney*—Low and Berman

ABSTRACT: The lower fifth wheel of a trailer coupling on a tractor is adjustable on the tractor in the normal direction of travel for proper load distribution. A selector on the tractor may be manually set for a desired fifth wheel position, and spring loaded locking pins on the fifth wheel are released by a cam on the selector for engaging openings in the trailer when the fifth wheel moving in the aforementioned direction reaches the selected position.

INVENTORS
Georg Göttler
Horst Göttler
By Low and Berman
AGENTS

MECHANISM FOR ADJUSTING THE POSITION OF A SEMITRAILER COUPLER ON A SEMITRAILER TRACTOR

This invention relates to coupling arrangements for coupling a semitrailer to a tractor, and particularly to an arrangement for adjusting the position of a coupling member, such as a lower fifth wheel, on the tractor in the normal direction of tractor movement.

It is common practice to mount the fifth wheel on notched guide rails, and to secure the fifth wheel in a desired position by means of locking members engaging the notches. The locking members are engaged either by remote control from the operator's cab or manually.

Since the position of the fifth wheel cannot be determined visually from the cab, the operator must leave the cab to ascertain proper locking of the fifth wheel in the desired position even when the locking members are remotely controlled. The fifth wheel is normally shifted by moving the tractor relative to a semitrailer coupled to the fifth wheel, and accidents may occur when an operator approaches the coupling on the moving vehicles for manually engaging the locking members.

The invention overcomes the aforementioned shortcomings of the known coupling arrangements by providing a selector mechanism on the tractor which permits a desired coupling position to be selected while the coupling is still in a different position. A lock actuator mechanism on the coupling member engages the selector mechanism during movement of the coupling member on its guide rails in the normal direction of tractor movement and responds to engagement with the selector mechanism in the selected position of the coupling member for actuating the locking mechanism and for thereby locking the coupling member and the guide rails to each other.

Other features and the attendant advantages of this invention will readily become apparent from the following detailed description of preferred embodiments when considered in connection with the appended drawing in which.

Figure 1:
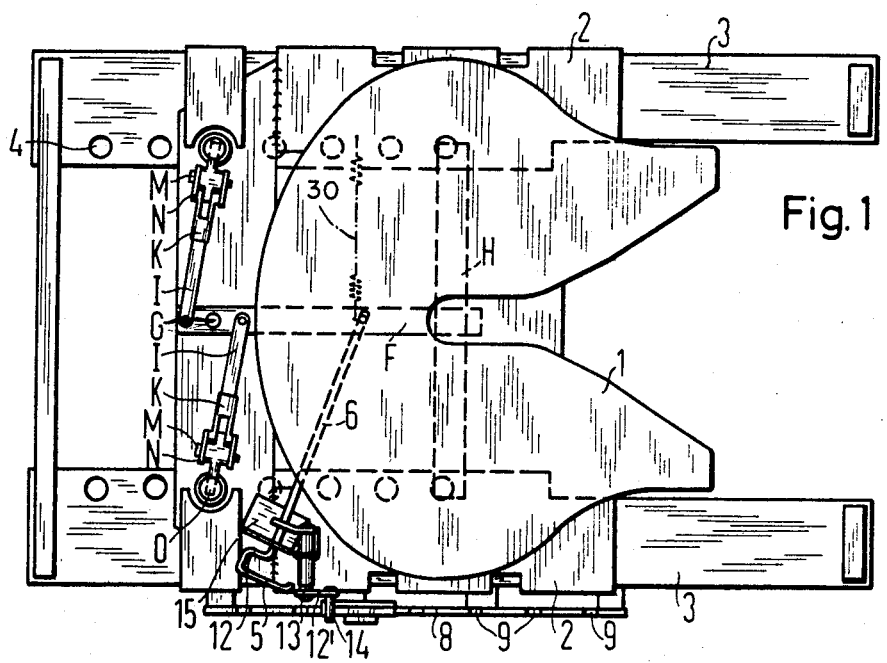
FIG. 1 shows a coupling arrangement of the invention in top plan view.

FIGS. 1 to 5 show only as much of the lower fifth wheel arrangement on a tractor as is needed for an understanding of this invention. The fifth wheel 1 is mounted on a frame 2 whose sides are movably supported on longitudinal guide rails 3 on the tractor chassis 7. The rails have respective rows of uniformly spaced openings 4. The fifth wheel 1 is arrested in a desired adjusted position on the rails 3 by means of two pins 0 vertically guided on the frame 2 in alignment with the rows, as is best seen in FIG. 1a, which shows a pin 0 engaging an opening 4 in a rail 3.

The two pins 0 are moved into and out of the openings 4 by means of a lever F pivoted to the frame 2 by a pin G. Two links I are hingedly fastened to the lever F at opposite sides of the pin G. Their forked ends K remote from the lever F are pivotally connected to respective first arms of bellcrank levers L mounted on the frame 2 by means of brackets N and horizontal pivot pins M. The second arms of the levers L engage apertures in the arresting pins 0.

Figure 1A:
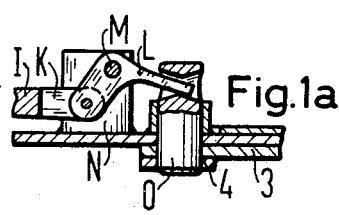
FIG. 1A illustrates a portion of the apparatus of FIG. 1 in enlarged elevational section.
Figure 2:
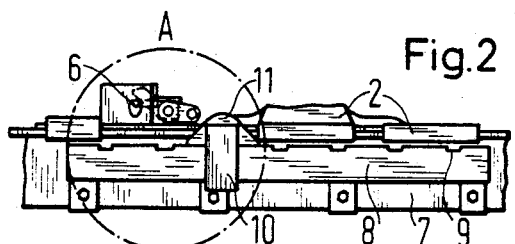
FIG. 2 shows the apparatus of FIG. 1 in partial side elevation.
Figure 3:
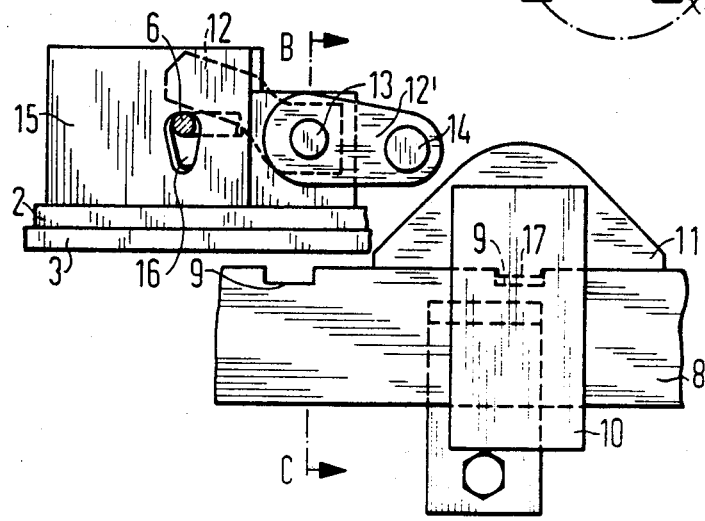
FIG. 3 shows the portion of the device of FIG. 2 enclosed in a chain-dotted circle A on a larger scale.

A long arm of the lever F is engaged by a helical tension spring 30 which biases the lever toward the arresting position shown in FIG. 1, movement of the lever being guided by a transverse bar H on the frame 2. The pins 0 are disengaged from the openings 4 by pulling a handle 5 on one end of a rod 6 whose other end is fastened to the lever F. As is better seen in FIG. 4, the rod 6 is received in an aperture 16 of a bracket 15 on the frame 2. The aperture 16 is dimensioned to pass the rod 6 together with a stop 6' radially projecting from the rod. When the rod 6 is pulled by the handle 5 from the position shown in FIG. 1 until the stop 6' passes the aperture 16, then lifted slightly and released (FIGS. 2 and 3), the stop 6' holds the rod against the tension of the spring 30, and the pins 0 are withdrawn from the openings 4, thereby releasing the fifth wheel 1 for movement on the rails 3.

A flat bar 8 is mounted on the chassis 7 of the tractor along one rail 3. Its narrow top edge has notches 9 uniformly spaced as the openings 4 and respectively associated with the same. The bar 8 guides a selector slide 10 of approximately J-shaped cross section (FIG. 5) whose top end carries a cam 11. A projection 17 on the slide 10 may engage each notch 9 to secure the slide 10 on the bar 8, and may be lifted from the notch 9 for moving the slide 10 to another position on the bar because of a clearance 18 between the bight of the J-shape and the lower edge of the bar 8.

Figure 4:
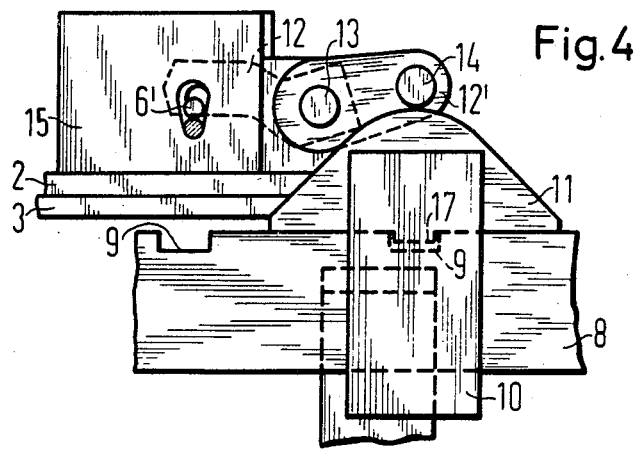
FIG. 4 shows the device of FIG. 3 in a different operating position.
Figure 5:
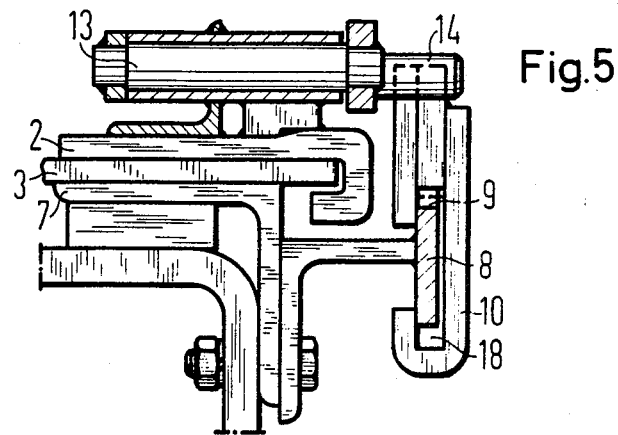
FIG. 5 illustrates the device of FIG. 3 in front elevational section.

The pivot pin 13 of a bellcrank lever 12,12' is mounted on the bracket 15 in such a manner that one arm 12 of the lever rests on the rod 6 in the pin-withdrawing position of the latter (FIG. 3) while a cam follower rod 14 projects from the other lever arm 12' into the path of the cam 11 on the bar 8. When the frame moves toward the right from the position shown in FIG. 2, the cam 11 lifts the arm 12', thereby depressing the arm 12 against the rod 6 and releasing the stop 6' from the bracket 15 as is shown in FIG. 4. The spring 30 is permitted thereby to insert the pins 0 in the openings 4, the pins being vertically aligned with openings associated with the notch 9 holding the slide 10 when released by the cam 11.

Figure 6:
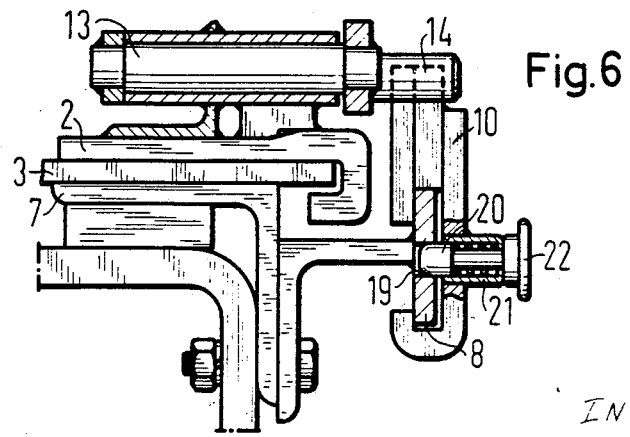
FIG. 6 shows a modification of the device of FIG. 5.
Figure 7:
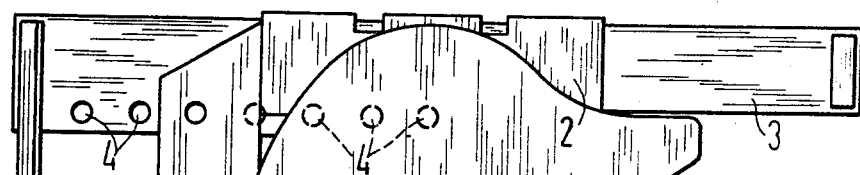
FIG. 7 illustrates another coupling arrangement of the invention in top plan view.
Figures 8, 9, 10:
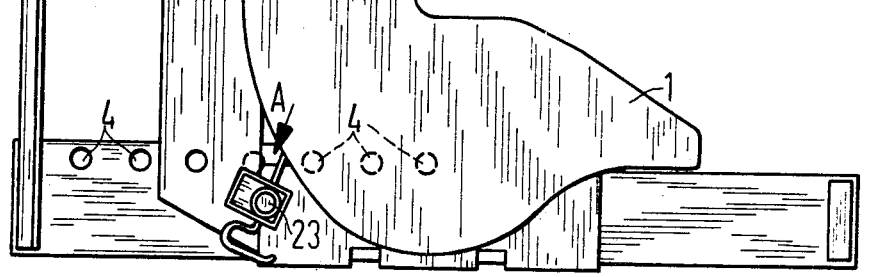
FIG. 8 shows a portion of the apparatus of FIG. 7 in enlarged elevational section.
FIG. 9 shows the device of FIG. 7 in section on the line D—E.
FIG. 10 shows the device of FIG. 9 in another operating condition.

In the modified device shown in FIG. 6 the bar 8 has a smooth top edge and is provided with a row of openings 19. The slide 10 is provided with a sleeve 21 in which a pin 20 is slidably received in a position for engagement with a selected bore 19 under the pressure of a spring. The pin may be withdrawn from the bore by means of an enlarged head 22, and the slide 10 thereafter shifted along the bar 8.

In the modified fifth wheel arrangement shown in FIGS. 7 to 10, the fifth wheel 1 may be adjusted along rails 3 and arrested in a desired position by pins 0 engaging openings 4 in the rails, as described with reference to FIGS. 1 to 5. The pins have been omitted from FIG. 7, and only the rod 6 of the pin inserting and withdrawing mechanism has been shown, the nonillustrated elements which link the rod 6 to the pins 0 being identical with those described above.

Supporting elements 24,25 fixedly fastened to the frame 2 and bracket 15 carry an electromagnet 23 whose armature 26 is equipped with a pad 27. The pad 27 is normally held above the rod 6 in the pin-withdrawing position of the latter illustrated in FIGS. 8 and 9. When the electromagnet 23 is energized, the pad 27 is pushed downward against the rod 6 to align the stop 6' with the aperture 16 in the bracket 15, and thus to permit the spring 30 to insert the pins 0 in the openings 4.

The magnet is energized by a nonillustrated switch operated by the selector cam 11 and located where the pin 14 is shown in FIG. 1. If so desired, the electromagnet may also be energized by an additional switch (not shown) in the operator's cab on the trailer.

When the fifth wheel 1 is shifted on the tractor in the direction of normal movement of the latter, the load distribution on the axles of the trailer and tractor is changed. Because of the weight limits permissible on each axle, the permissible load on the trailer coupling changes with the location of the fifth wheel 1.

Figure 11:
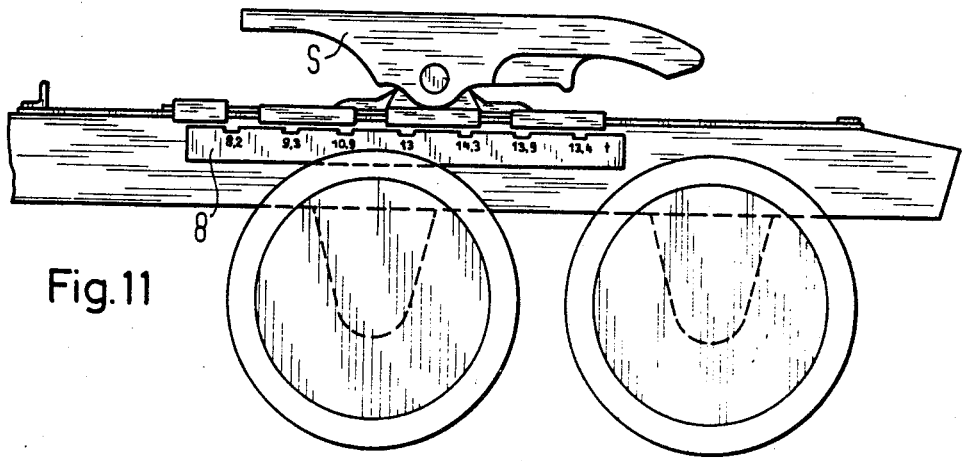
FIG. 11 illustrates the apparatus of FIG. 7 in side elevation.
Figure 12:
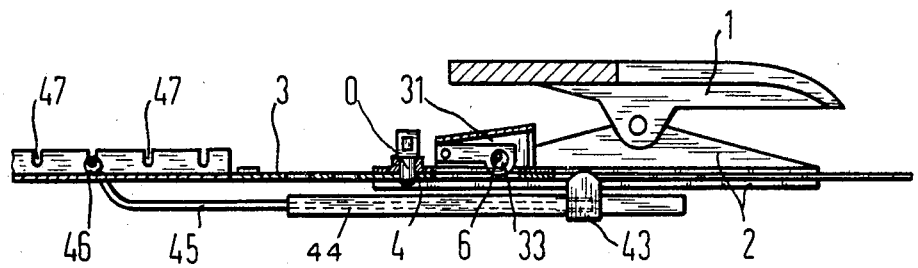
FIG. 12 is a fragmentary side elevational section of yet another coupling arrangement of the invention in section on the line XII–XII in FIG. 13.
Figure 13:
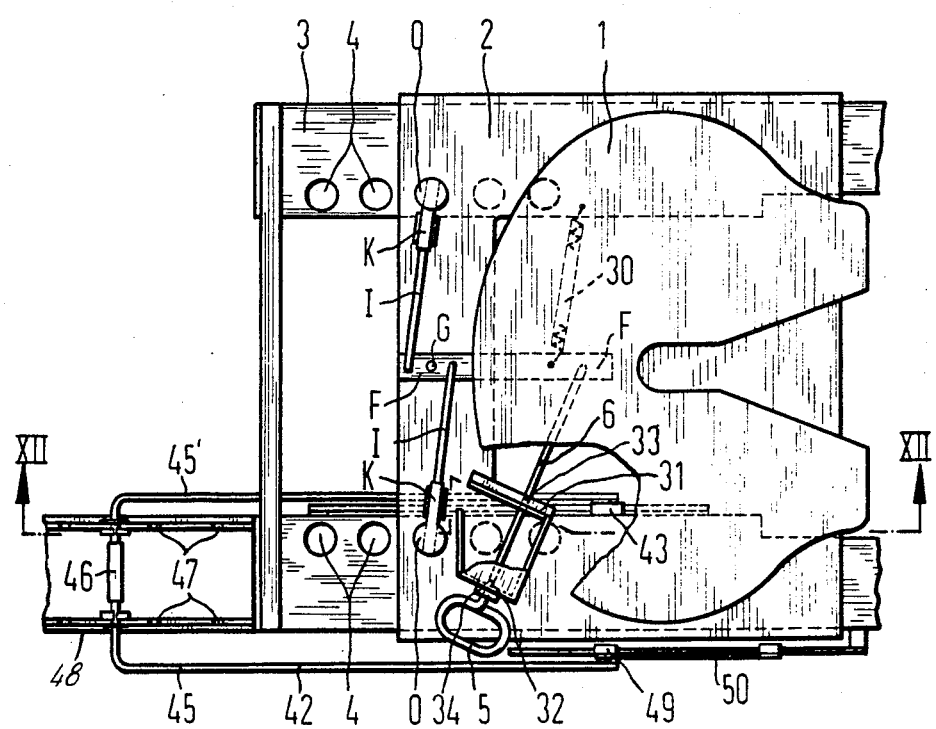
FIG. 13 shows the coupling arrangement of FIG. 12 in top plan view, portions of the structure being broken away to reveal internal features.
Figure 14:
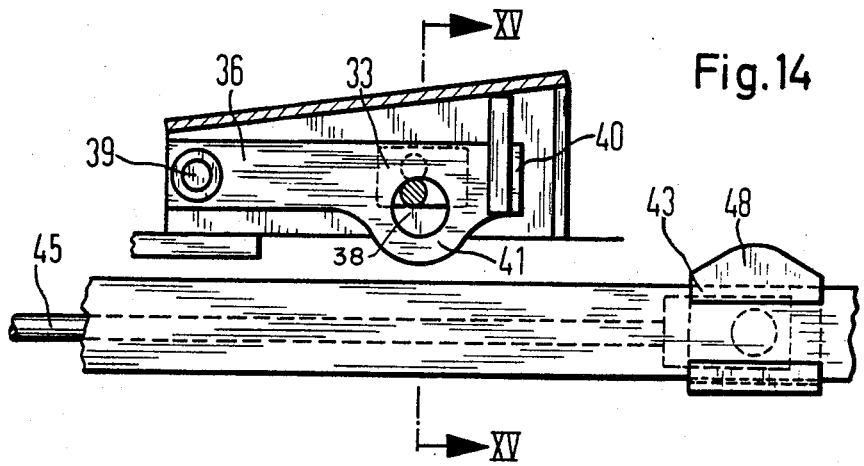
FIG. 14 shows a portion of the device of FIG. 12 on a larger scale.
Figure 15:
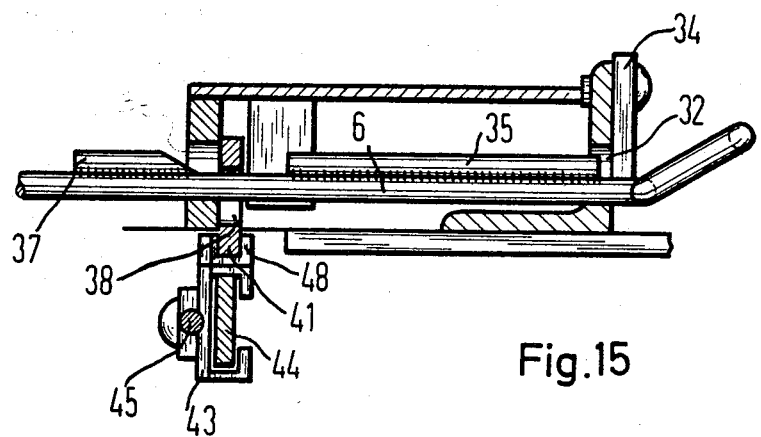
FIG. 15 is a sectional view of the device of FIG. 14 taken on the line XV–XV.
Figure 16:
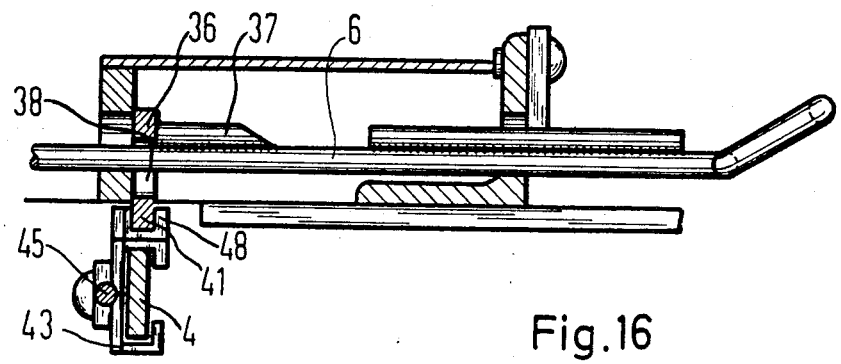
FIG. 16 shows the device of FIG. 15 in a different operating position.
Figure 17:
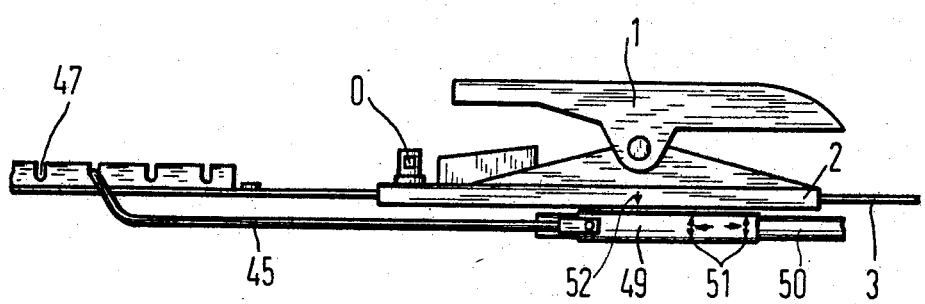
FIG. 17 shows the apparatus of FIG. 12 in side elevation.

As is shown in FIG. 11, the several notches in the bar 8 may be provided with indicia indicating the load (in tons) permissible in the position of the fifth wheel 1 selected by inserting the slide 10 in the notch.

The apparatus shown in FIGS. 12 to 17 is partly identical with that described above with reference to FIGS. 1 to 5, and corresponding elements have been provided with the same reference characters.

The lower fifth wheel 1 is mounted on the frame 2 for movement of guide rails 3, and secured in a desired position by pins 0 engaging bores 4 in the rails 3. The pins are operated by links I having forked ends K, the links being secured to a lever F operated by means of a rod 6 against the restraint of a spring 30 to release the pins 0.

The rod is guided in aligned opposite apertures 32, 33 in the flanges of an inverted channel 31 which forms an upwardly closed casing and is fastened to the frame 2. A latch 34 pivoted on the outside of the channel 31 near the aperture 32 normally is biased by gravity into the path of a stopping rod 35 fixedly superposed on the rod 6 in parallel alignment, and thereby prevents the rod 6 from being pulled by the handle 5 from the locking position shown in FIGS. 14 and 15. The latch 34 must be lifted before the handle 5 can be pulled.

Another stopping rod 37 fixed on the rod 6 in axial alignment with the rod 35 cooperates with a latch 36 pivoted to the channel 31 near the aperture 33 by a pin 39, the bar 6 passing through a bore 38 of the latch 36. The free end 40 of the latch 36 near the bore 38 has a downwardly projecting rounded cam portion 41. The latch 36 is mounted within the channel 31 and not accessible to an operator's hand.

The latch may be released by a selector mechanism having a cam 43 engageable with the cam portion 41 for lifting the latch 36. The cam 43 is guided on a rail 44 attached to the frame 2 and moved by an approximately U-shaped member 42 whose horizontal leg portions 45, 45' extend along the rail 44 and along an outer longitudinal edge of the frame 2 respectively and are connected by a short transverse bar 46. The bar may be engaged with notches 47 in two parallel, longitudinal flanges 48 on the frame 2, the spacing of the notches corresponding to that of the bores 4 in the guide rail 3.

A guide rail 50 on the guide rails 3 guides a slide 49 attached to the leg portion 45 of the member 42. Cooperating indicia 51, 52 on the slide 49 and on the frame 2 indicate the position of the concealed cam 43 which lifts the latch 36 and thereby releases the rod 6 for movement by the spring 30 when the cam portion 41 travels over the cam 43 during longitudinal movement of the fifth wheel 1 on the chassis 7.

We claim:

1. In a coupling arrangement for coupling a semitrailer to a tractor including a guide member on said tractor, a coupling member mounted on said guide member for movement in the normal direction of tractor travel, and locking means for locking said members to each other in each of a plurality of positions spaced in said direction, the improvement which comprises:

a. selector means on one of said members for selecting one of said positions while said coupling member is in another position;
b. lock actuator means on the other member engageable with said selector means during said movement of said coupling member and responsive to engagement with said selector means in the selected position of the coupling member for actuating said locking means and for thereby locking said members to each other;
c. manually operated withdrawing means for withdrawing said locking means and for thereby unlocking said members for relative movement; and
d. blocking means preventing manual actuating of said locking means.

2. In an arrangement as set forth in claim 1, said selector means being mounted on said guide member.

3. In an arrangement as set forth in claim 2, said selector means including a bar member, a selector member movable on said bar member in said direction and engageable with said lock actuator means, and releasable means for securing said selector member on said bar member against movement in said direction in each of a plurality of selected positions respectively corresponding to said positions of said coupling member.

4. In an arrangement as set forth in claim 3, said selector member having a cam face, and said lock actuator means including a pivotally mounted member angularly displaced by engagement with said cam face.

5. In an arrangement as set forth in claim 3, said lock actuator means being electrically operated, and including a switch engageable with said selector member for operating said lock actuator means.

6. In an arrangement as set forth in claim 3, cooperating indicia on said selector member and on said bar member for indicating the permissible load of said trailer in each of said positions of the coupling member.

7. In an arrangement as set forth in claim 1, said blocking means including latch means for holding said withdrawing means in a position in which said locking means are withdrawn and said members are unlocked, said selector means cooperating with said latch means for releasing said withdrawing means from said position of the same in the selected position of the coupling member.

8. In an arrangement as set forth in claim 7, said blocking means further including means making said latch means inaccessible to an operator's hand.

9. In an arrangement as set forth in claim 7, said locking means including a locking member, said guide member being formed with a row of openings spaced in said direction, said locking member being mounted on said coupling member for movement along said row when said coupling member moves in said direction; said lock actuator means including biasing means biasing said locking member toward engagement with said openings in said row, said withdrawing means withdrawing said locking member from the engaged opening when operated.

10. In an arrangement as set forth in claim 8, said means making the latch means inaccessible including a casing formed with opposite apertures; said withdrawing means including an elongated rod member received in said apertures for longitudinal movement through said casing, a handle on a portion of said rod member outside said casing, and connecting means connecting said rod member to said locking means for withdrawing said locking means in response to longitudinal movement of said rod member in one direction into a predetermined position, and for releasing said locking means in response to movement of said rod member from said predetermined position into a locking position in a direction opposite to said one direction; an abutment on said rod member, said abutment being in said casing when said rod member is in said predetermined position thereof; said latch means including a latch member movably mounted in said casing and biased toward engagement with said abutment for thereby holding said rod member in said predetermined position thereof; cooperating cam means on said selector means and on said latch member for disengaging said latch member from said abutment and for thereby releasing said rod member for movement in said opposite direction away from said predetermined position when said guide member and said coupling member are in the selected position.

11. In an arrangement as set forth in claim 9, a blocking member longitudinally spaced on said rod member from said abutment, another latch member movably mounted on the outside of said casing and biased toward a position in which said other latch member engages said blocking member and thereby holds said rod member in said locking position against a pulling force applied to said handle.